Jan. 21, 1964 R. P. ANDERSON ETAL 3,118,785
RECORDING FILM HAVING A THERMOPLASTIC POLYESTER IMAGE RECEIVING LAYER
Filed Oct. 30, 1961
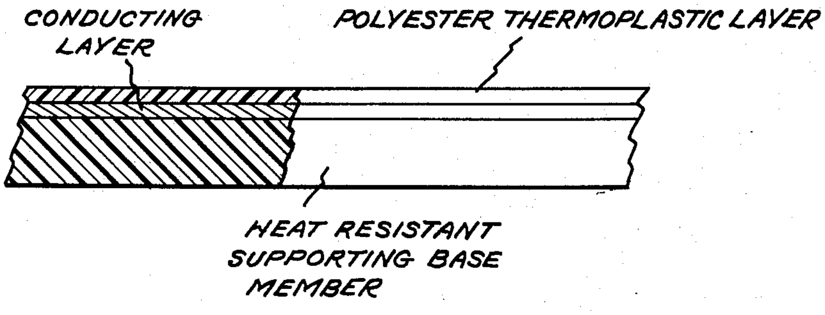
Inventors:
Robert P. Anderson,
Burton T. MacKenzie Jr.,
by Joseph T. Cohen
Their Attorney.

United States Patent Office 3,118,785

Patented Jan. 21, 1964

3,118,785
RECORDING FILM HAVING A THERMOPLASTIC POLYESTER IMAGE RECEIVING LAYER

Robert P. Anderson, Schenectady, N.Y., and Burton T. MacKenzie, Jr., Stratford, Conn., assignors to General Electric Company, a corporation of New York Filed Oct. 30, 1961, Ser. No. 148,461
8 Claims. (Cl. 117—211)

This invention is concerned with compositions of matter and articles prepared therefrom useful in the recording, storing and reproducing of photographic images, technical data, etc. More particularly, the invention relates to a recording medium comprising a base supporting member and a thermoplastic layer thereon comprising a solid polyester (hereinafter designated as "polyester") composed essentially of recurring units of the formulas (I)

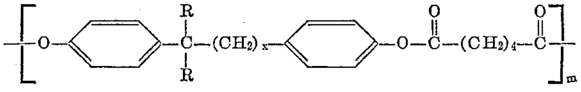

and (II)

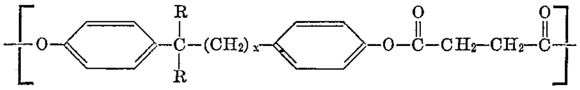

where R may be the same or different members selected from the class consisting of hydrogen and the methyl group, $x$ is a whole number from 0 to 1, $m$ is a whole number from 5 to 14, inclusive, and $n$ is a whole number equal to from 0 to 4, inclusive, the sum of $m+n$ being at most 14. Advantageously the number of groups of Formula II is equal to from 0 to 50 mol percent of the total molar concentration of units of Formulas I and II. Terminal groups on the polymer can be hydroxyl groups or groups derived from chain-regulating (i.e., molecular-weight-regulating) compounds, such as phenol. The recording media can be in the form of films, for instance, tapes, sheets, etc., as well as slides, disks, etc., which are suitable for recording, storing and reproducing photographic images and technical data, employing the above polyester as the thermoplastic layer in which such images and data are recorded, stored and reproduced.

In the copending applications of William E. Glenn, Jr., Serial No. 698,167, filed November 22, 1957, now abandoned, and Serial No. 783,584, filed December 29, 1958, now abandoned, both of which are assigned to the same assignee as the present invention, are disclosed and claimed an electronic method and apparatus for recording, storing, and reproducing photographic images and technical data. According to this method, technical data and photographic images are first converted electronically into coded signals which are further reduced to variations in the intensity of a beam of electrons, and the electron beam with its negatively charged particles is used to scan a special surface so as to introduce onto this surface a pattern of negative charges (from the electrons deposited) which arrange themselves in accordance with the data or image to be recorded. This pattern of electric charges on the heat-deformable thermoplastic layer is then converted to a pattern of depressions, ridges, etc., that can be observed optically.

This conversion can be achieved by heating the composite article or recording medium, particularly the surface thereof with, for instance, direct application of heat or by heat generated by radio frequency energy acting on a conducting layer, whereby the heat causes only the top thermoplastic negatively charged layer to fuse or melt. When this happens, the negative charges are attracted to the conducting layer positioned under but not necessarily in contact with the thermoplastic layer, thus deforming the surface of the thermoplastic upper layer into various depressions, hills, ridges, etc. Thereafter, the heated surface is cooled or allowed to cool immediately to set or solidify these hills, ridges, and other deformations in the thermoplastic layer. The recording medium thus treated can now be read or projected visually by passing a beam of light through it in cooperation with a special optical system for conversion into an image or can be optically converted into the desired information or data in the form of electrical signals. The image can be viewed directly, projected on a screen, transmitted electronically for viewing on a television screen elsewhere, or can be simply stored on film. An additional description of the method for recording in the manner described above can be found in an article by William E. Glenn, Jr., in "Journal of Applied Physics," December 1959, pages 1870–1873.

Because the thermoplastic layer is capable of being heated to the fused state (at which time it develops the surface deformations by action of the induced electric field on a charged portion of the liquid and the pattern of ripples thus produced frozen into a permanent record by promptly cooling the liquid thermoplastic layer to the solid state), it is possible to employ such recording material many times by merely subjecting the surface layer to the action of heat at a temperature high enough to cause fusion of the upper layer to a smooth surface, thus "erasing" the information stored in the aforesaid thermoplastic layer. In addition to the ability to reuse the recording medium, the latter can be used to prepare a master copy for duplication by techniques similar to photograph disk stampings.

There are several requirements which are necessary for a satisfactory recording medium ("recording medium" or "recording material" will hereinafter be intended to mean the composite structure including the upper thermoplastic layer upon which the information is recorded and used in the electronic recording previously described, the base supporting layer and the conducting layer if it is part of the composite structure). In the first place, the recording medium must have optical clarity and must be transparent. It is preferably water-white (i.e., water-clear) or only slightly tinted in thin films. Any trace of haze should be avoided in the recording medium because it will interfere with the later "reading out" or projection of any images which may have been introduced into the recording medium.

The recording medium must also have certain electrical characteristics, particularly it must be a good insulator and have high electrical resistivity; usually it is desirable that the specific resistivity be greater than about $10^{11}$ ohm-centimeters when in the liquid state at the time it is heated to effect formation of any depressions or ridges or other deformations in surface thermoplastic layer.

In addition, for certain applications, particularly in tapes, the recording medium, including the surface thermoplastic layer, must be sufficiently flexible and strong to enable it to be rolled up around small diameters especially when the thermoplastic layer is present in thicker than usual sections. These are the usual requirements encountered in the case of projection machines, for instance, 16-millimeter projection machines which may be used to project the image on the screen.

The thermoplastic layer of the recording medium must be stable under moderate electron bombardment from the electron high voltage accelerating apparatus. The thermoplastic layer preferably has a maximum vapor pressure of $10^{-5}$ to $10^{-6}$ mm. Hg when in the liquid state, that is, when it is subjected to the elevated temperatures required to deform the thermoplastic layer of the recording medium in accordance with the changes thereon. The thermoplastic layer must also be stable at elevated temperatures at which it will be deformed by the heat necessary to "develop" the charge on the thermoplastic layer.

Of major importance, the thermoplastic layer of the recording medium must be capable of having a fairly sharp melting point in order that the developing of the proper image on the thermoplastic layer proceed with a minimum of control difficulties. For a broad spectrum of use, the thermoplastic layer should be solid at temperatures of at least 65° C., but should be capable of being converted to the liquid or fused state at temperatures of at least about 85° C. depending on the supporting backing layer.

Since the recording medium may comprise at least two layers and more often three layers, it is also essential that the thermoplastic layer have good adhesion to the backing material, whether it is the supporting backing or the conducting layer. Since one embodiment of the recording medium comprises a three-layer structure composed of the backing material, the upper surface thermoplastic layer and an intermediate conducting layer (for instance, a thin film of metal, or a metal oxide or a metal salt), it is additionally important that the thermoplastic layer have good adhesion to the conducting layer or the conducting surface.

As a further requirement, it is important in those cases where the recording medium will be in the form of a tape and thus will be rolled upon itself and stored, that the thermoplastic layer be substantially free of cold flow that will cause any change in the configuration of the recorded information on the thermoplastic surface, such as any depressions or hills or other deformations on the surface of the thermoplastic layer. Since the storage might take place under conditions where the temperature might rise to as high as 40° C. to 50° C., this cold flow must be non-existent or very low even at these temperatures. Any significant cold flow may render the tape incapable of storage in reel condition as is the usual movie film. As a still further requirement, it is essential that the thermoplastic layer have good resistance towards oxygen attack so that it maintains high electrical resistivity during processing of the tape. Again, in those cases where a tape is involved, and because the tape may be rolled up on itself, it is also essential that the thermoplastic layer should be non-tacky and should not stick to itself or to any other surface with which it might come in contact in the rolled-up state.

Although thermoplastic compositions are described in the aforementioned pending applications of William E. Glenn, Jr., Serial Nos. 698,167 and 783,584, both of which are abandoned, it has been found that these thermoplastic materials do not have a sharp enough fushion point to the liquid state of the thermoplastic layer; furthermore, there is much to be desired in the adhesion of the thermoplastic layer to the conducting layer. Additionally, it has been found that the thermoplastic layer should be more flexible in those instances where the recording medium would be wound around small diameters such as in the case of spindles and sprockets used in projection equipment. As a still further area of improvement, the thermoplastic layer should resist adhesion to the adjacent back of the base layer when the film is in the rolled-up state, for instance, as a reel, or spool, etc.

A recording medium which employs a thermoplastic layer embracing the above-mentioned desirable characteristics is found described and claimed in the copending application of Edith M. Boldebuck, Serial No. 8,587, filed February 15, 1960, and assigned to the assignee of the present invention, now U.S. Patent 3,063,872, issued November 13, 1962. In this Boldebuck application, the recording medium contains as the thermoplastic layer, a solid heat deformable mixture of ingredients comprising (1) an organopolysiloxane and (2) a thermoplastic, solid (i.e., solid at room temperature) aryl polymer selected from the class consisting of (*a*) polyarylene ethers, (*b*) a polystyrene, and (*c*) mixtures of (*a*) and (*b*). Although these thermoplastic compositions have been found to be useful and to possess improved properties over thermoplastic layers previously employed in the above-described recording media, nevertheless certain difficulties have arisen in connection with the use of these thermoplastic compositions for the recording medium.

In the first place, the Boldebuck thermoplastic layer is composed of a mechanical mixture of ingredients containing at least two preformed compositions, namely, the organopolysiloxane and the aryl polymer. It is obvious that the use of two such materials for a thermoplastic composition introduces many control problems in preparing these compositions and insuring that the properties and characteristics of each of the ingredients satisfies specifications designed to render the thermoplastic composition optimum for use as a thermoplastic layer. Furthermore, the compositions used for the thermoplastic layer in the Boldebuck recording medium are relatively expensive materials and add to the cost of the recording medium. In addition it has also been found that the thermoplastic composition used in the Boldebuck application has reduced flexibility when used in thicker sections so that the ability to bend films containing thicker sections of the Boldebuck compositions over small diameters, for instance, over ⅜ inch to ½ inch diameter mandrels is materially reduced. This is an undesirable characteristic when it is desired to use projection machines for recording medium tapes in which the sprockets carrying the film are extremely small. Finally, the means for making each of the polymeric elements comprising the Boldebuck thermoplastic layer requires extensive processing and careful control of the process, thus again adding to the cost of the ultimate recording medium.

Unexpectedly, we have discovered that in addition to the desired improvements for the thermoplastic layer which have been referred to above, we also are able to overcome the difficulties which have arisen in connection with the use of a thermoplastic recording medium composed of an organopolysiloxane and the aryl polymer, by employing as the thermoplastic layer a solid polyester composed essentially of recurring units having the Formulas I and II, where R, $x$, $m$ and $n$ have the meanings given above. In addition to obviating the difficulties recited above, it has also been found that improvements are noted in the ability to coat the base members either with or without the conducting layer over that resulting from trying to coat the base member with previously known thermoplastic compositions for recording media of the type described above.

The discovery that this particular class of polyesters was useful in recording media and possessed improved properties over those heretofore described was entirely unexpected and in no way could it have been predicted for the reason that attempts to use by themselves shorter or longer chain polyesters (meaning longer or shorter chain dicarboxylic acid residues) resulted in a thermoplastic layer which either was too brittle or else had excessive cold flow. In one instance, the polyester derived from the reaction of sebacyl chloride and of bis-(4-hydroxyphenyl)-2,2-propane (also known as "bisphenol A") when applied as the thermoplastic layer would not accept an electrical charge when subjected to an electron beam for information recording purposes.

It is accordingly one of the objects of this invention to prepare a polyester composition which can be used as a thermoplastic layer for recording, storing and reproducing photographic images, technical data, etc.

Another object of the invention is to prepare recording media in which the thermoplastic layer of such recording media is prepared from a single composition rather than a mechanical mixture of compositions.

It is a still further object of the invention to prepare recording media in which the thermoplastic layer thereon is sufficiently flexible so as to be capable of being wound around extremely small diameters even when in thick sections without cracking or in any way separating from the substrate to which it is applied.

An additional object of the invention is to prepare a recording medium in which the thermoplastic layer on which information will be recorded and stored will have no undesirable affinity for the base layer with which it may come in contact in a rolled-up state and will show no undesirable cold flow when subjected to the pressures which may be encountered in the case of film maintained for long periods of time in the rolled-up state.

Other objects of the invention will become more apparent from the discussion which follows.

The polyester compositions used as the thermoplastic layer in our recording media can be prepared by various means. One method comprises reacting from about 45 to 55 mol percent of a dihydroxy phenyl compound of the formula

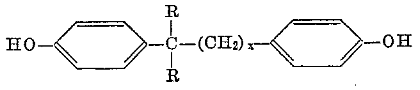

where R and $x$ have the meaning given above with from about 55 to 45 mol percent of either adipic acid or adipyl chloride, either of the adipyl compounds being used alone or in combination with succinic acid or succinyl chloride in the requisite molar concentrations so that the succinic acid residue is equal to from 0 to 50 mol percent of the total molar concentration of the succinic acid residue and the adipic acid residue using a suitable solvent which is a liquid at the temperatures at which the esterification will proceed, such as benzene, toluene, xylene, pyridine, chlorinated diphenyl oxide, monochlorodiphenyl, dichlorodiphenyl, diphenyl oxide, etc. The mixture of ingredients is advantageously heated at temperatures of about 80°–300° C. for times ranging from about ½ hour to 5 hours or more, until the desired average molecular weight is obtained.

In order to control the average molecular weight within the range of from about 1500–4500, when determined in benzene, it is desirable to use a chain-regulating agent such as, for instance, phenol, various mercaptans (e.g., dodecyl mercaptan, hexadecyl mercaptan, etc.), acetic acid, benzoic acid, etc. The amount of chain regulating agent is usually small and it is advantageously in the range of from 1 to 5 mol percent of the total molar concentration of the dihydroxy phenyl compound and the adipic acid or adipyl chloride, or of the combination of the dihydroxy phenyl compound, the adipyl compound, and the succinic acid or succinic acid derivative.

After the reaction is completed and the desired molecular weight polyester is obtained, the polyester can be precipitated by various means, including liquid hydrocarbons, e.g., n-hexane, to give a polymer which advantageously has an intrinsic viscosity in chloroform of from 0.1 to about 0.9 dl./g.

Among the dihydroxy phenyl compounds which may be employed to make the polyester may be mentioned, for instance, bisphenol-A[bis-(4-hydroxyphenyl)-2,2-propane], 4,4′-dihydroxy diphenyl methane, 4,4′-dihydroxy diphenyl ethane (the hydroxyphenyl groups being either on the same or different carbon atoms of the ethane residue), bis-(4-hydroxy phenyl)-1,2-propane having the formula

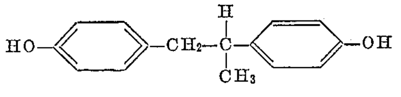

etc.

The polyester advantageously has a stick temperature of 60–90° C. and a fluid temperature (i.e., becomes a fluid) of about 90–115° C., and when used on a recording tape has sufficient flexibility to be able to be wound around a mandrel as small as ¼ to ⅜ inch in diameter without cracking.

The backing material for the recording medium may be either a flexible composition or may be a rigid inflexible material. Examples of rigid materials which can be employed (keeping in mind that optical clarity, heat resistance, and radiation resistance are usually the required properties) are, for instance, glass (in the form of plates, slides, disks, etc.); unsaturated polyester resins (formed from the reaction of a polyhydric alcohol, such as ethylene glycol, diethyl glycol, propylene glycol, dipropylene glycol, etc., and an alpha-unsaturated alpha-beta-dicarboxylic acid or anhydride, for instance maleic acid, maleic anhydride, fumaric acid, citraconic acid, etc.); combined with these unsaturated polyesters one may also incorporate such copolymerizable cross-linking ingredients, such as diallyl phthalate, diethylene glycol dimethacrylate, etc. One can also employ metals such as aluminum, nickel, chromium, etc., where the metal serves both as a conducting layer and as a reflective surface which can be read optically by reflection.

Examples of flexible materials which can advantageously be employed as the backing material are, for instance, polyethylene terephthalate (which can be obtained by the transesterification of esters of terephthalic acid with divalent alcohols, for example, ethylene glycol as shown in U.S. Patent 2,641,592—Hofrichter), such polyethylene terephthalate being sold by E. I. du Pont de Nemours and Company of Wilmington, Delaware, under the name of Mylar. A more refined grade of polyester terephthalic acid tape or film found highly appropriate as the basis for recording images (and which contains small intercondensed residues from dihydric alcohols, such as propylene glycol-1,3 to reduce crystallinity) is sold under the name of "Cronar."

Another backing material which can be used advantageously because of its good heat resistance, strength, inertness and resistance to radiation are polycarbonate resins corresponding to the formula

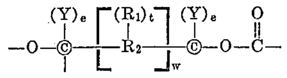

where $R_1$ is hydrogen or a monovalent hydrocarbon radical, many examples of which have been given above for R (where more than one $R_1$ is used, they may be the same or different); $R_2$ is selected from the class consisting of alkylene and alkylidene residues (e.g., methylene, ethylene, propylene, propylidene, isopropylidene, cyclohexylidene, etc.), oxygen, etc.; C is the residue of an aromatic nucleus, (e.g., benzene, naphthalene, biphenyl, etc. nucleus); Y is a substituent selected from the group consisting of (*a*) inorganic atoms, (*b*) inorganic radicals, and (*c*) organic radicals, (*a*), (*b*) and (*c*) being inert to and unaffected by the reactants and reaction conditions, $e$ is a whole number equal to from 0 to a maximum determined by the number of replaceable nuclear hydrogens substituted on the aromatic hydrocarbon residue C; $t$ is a whole number equal to from 0 to a maximum determined by the number of replaceable nuclear hydrogens on $R_2$; and $w$ is a whole number equal to from 0 to 1, inclusive. These compositions and directions for preparing these compositions are disclosed and claimed in the copending application of Daniel W. Fox, Serial No. 520,166, filed July 5, 1955, and assigned to the same assignee as the present invention. By reference, this application is made a part of the disclosures and teachings of the instant application. It will be apparent to those skilled in the art that other compositions may be employed as backing materials where the softening point is sufficiently high so as to allow heating of the thermoplastic layer without adversely affecting the base layer.

In many instances, there is interposed between the thermoplastic surface and the backing, a conducting layer which can be subjected to radio frequency energy as a means for heating the thermoplastic layer. This conducting layer acts as the layer which becomes positively charged beneath the thermoplastic layer and when the thermoplastic layer is heated to cause the thermoplastic material to become fused and deformable, the deposits of negative charges on the top of the thermoplastic layer are attracted to the positively charged conducting layer, thus deforming the thermoplastic surface of the film. Among such conducting layers (which should be thin enough to be optically clear if interposed between the base and the thermoplastic layer) may be mentioned the various metals, for instance, iron, chromium, tin, nickel, etc.; metallic oxides, such as stannic oxide, cuprous oxide, etc.; salts, for instance, cuprous iodide, etc. In using the conducting layer, it is essential that the layer of metal or metal compound applied to the base layer be no thicker than is required to obtain a transparent (optically clear) film thereon. For this reason, it has been found that the metal film is advantageously of the order of about 10 to 100 angstroms (A.) or 0.001 to 0.01 micron thick, and that it should have a resistivity of between 1,000 and 10,000 ohms per square centimeter for optimum radio frequency heating if that is the method used for developing the deformation pattern.

The thickness of the thermoplastic layer can vary widely but advantageously is approximately 4 to 20 microns thick. The base layer thickness can also vary widely as long as it has the proper electrical and radiation resistance flexibility, strength, heat resistance, etc.; this base layer can be from a few microns in thickness to as much as 50 to 400 microns or more in thickness.

The conducting layer is advantageously applied to the backing by the well-known method of volatilizing the metal or metal compound in a vacuum at elevated temperatures and passing the backing in proximity to the vapors of the metal or metal compound so as to deposit an even, thin, optically clear, adherent film of the metal or metal compound on the backing and preferably while the entire assembly is still under vacuum. One method for applying a metal salt conducting layer to the backing, e.g., polyethylene terephthalate, is found in U.S. Patent 2,756,165—Lyon. Thereafter, a solution of the thermoplastic composition is applied to the surface of the conducting layer, and the solvent evaporated to deposit a thin film of the thermoplastic composition on the conducting layer.

The particular solvents employed for the thermoplastic composition may be varied widely. Included among such solvents are aromatic hydrocarbon solvents, e.g., toluene, xylene, benzene, etc. Solids weight concentrations of from 10 to 30 percent of the thermoplastic composition in the solvent are advantageously used.

In the accompanying drawing, the single figure shows an optically clear tape recording medium composed of an upper thermoplastic layer 1 comprising the adipate polyester recited above, a base member 2 supporting the thermoplastic layer, and an intermediate conducting layer 3.

The following examples are given by way of illustration and not by way of limitation, as to how the present invention may be practiced. All parts are by weight unless otherwise noted.

The "liquid temperature" (which may or may not be identical with the temperature of the thermoplastic layer at the time of development of the surface deformations) of the thermoplastic compositions described below was determined by placing on a melting point block a sample of chromium-coated polyethylene terephthalate film (Cronar film), on which a film of the thermoplastic composition had been deposited and the solvent evaporated. The thermoplastic surface was scratched with a needle as the temperature was gradually raised, and the temperature at which the thermoplastic copolymer flowed in immediately to obliterate the scratch was recorded as the "liquid temperature."

The intrinsic viscosities described below were obtained at 25° C. by using chloroform as the solvent. The number average molecular weight was determined ebullioscopically using benzene or methylene chloride as the solvents. Finally, the "stick temperature" of the polyester was determined by heating the tape with the polyester composition on the surface and bringing the polyethylene terephthalate backing into contact with the heated polyester surface and determining the temperature at which the polyester stuck or caught on to the applied backing.

The actual writing on the thermoplastic surface (which was about 7.5–12 microns thick) was carried out as follows. An electron gun was mounted in an evacuated apparatus (described in the Glenn applications) containing an infra red heater. The optically clear tape was passed over the heater and while the thermoplastic layer was in the molten condition (as a result of heating the tape to a temperature of about 70–100° C.), it was exposed to the electron beam. The electron beam was controlled to sweep back and forth in a linear path as the tape was passed under the beam. While the beam was operated at a current of 1 microamp. with a 6 kv. accelerating potential drop from filament to ground plane (i.e., the conducting layer), about 1/60 of a second was required to inscribe information (in an area of about 0.225 inch by 0.155 inch) for a single image by 262½ sweeps of the electron beam.

The thermoplastic layer was then allowed to cool (while still in vacuum) to set or freeze the deformations in the surface of the thermoplastic layer.

EXAMPLE 1

Into a reaction vessel equipped with condenser, means for flushing nitrogen, and a stirrer, were placed 100 parts monochlorodiphenyl (as solvent), 27.9 parts of bisphenol-A, and 18.3 parts adipyl chloride. The reaction mixture was heated to 256° C. over a 2.5 hour period. The polyester thus obtained, which consisted essentially of the recurring unit

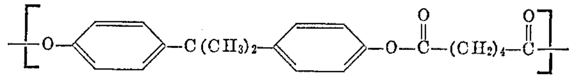

was precipitated in n-hexane, dissolved in benzene and treated with decolorizing carbon and infusorial earth, after which it was re-precipitated in hexane and vacuum-dried to give about 33.4 parts of a solid polymer having an intrinsic viscosity in chloroform of 0.105 dl./g., and an average molecular weight of about 2500. A 27 percent solution of this polyester in benzene was applied directly to about a 0.001 micron thick chromium coated surface deposited on a 30 mm. wide by 0.004 inch thick optically clear optical grade polyethylene terephthalate tape sold as "Cronar" by E. I. du Pont de Nemours Company (methods for preparing such film may be found disclosed in such patents as U.S. 2,678,285 and 2,698,241). After removing the solvent by first air-drying and then by heating for 10 or 15 minutes at about 140–150° C. it was found that the polyester thermoplastic layer was about 10 microns in thickness. Another tape was prepared similarly as above with the exception that the thickness of the polyester coating on the surface of the chromium-coated polyethylene terephthalate was about 12 microns. Each of these tapes was then tested for adhesion to the chromium substrate and for flexibility. In each instance, it was found that the tapes could be wound around mandrels of from ¼ inch to ⅜ inch in diameter without any lifting or cracking of the polyester film. The thermoplastic polyester coatings were found to have a liquid temperature of about 81° C. When these tapes were written upon in the manner described above and in the Glenn applications, and when projected, each tape gave clear well-defined images.

EXAMPLE 2

In this example, employing the same apparatus and conditions as were used in Example 1, 200 parts monochlorodiphenyl, 22.8 parts bisphenol A, 18.3 parts adipyl chloride and 1 part phenol (as chain-regulating agent) were heated to 250° C. over a 1 hour period. The polyester obtained was precipitated in n-hexane and re-precipitated from methyl ethyl ketone in n-hexane. The polyester was dried in a vacuum giving 31.5 parts of solid polymer having a molecular weight of about 1500–2000 and an intrinsic viscosity in chloroform of 0.14 dl./g. A benzene solution of this polyester was coated on a chromium-coated Cronar film similarly as was done in Example 1 to a thickness of about 10 microns. This coating again exhibited good adhesion to the chromium coating, and was quite flexible as evidenced by the fact that it could be bent around a 3/8 inch mandrel without separation from the chromium substrate or evidence of cracks in the thermoplastic layer. The thermoplastic surface had a fluid temperature of 96° C. When the thermoplastic recording medium was written on according to the description in the aforementioned Glenn applications and projected as described in Example 1, a clear well-defined image was obtained. The thermoplastic layer and the films made therewith were optically clear and had the desired electrical resistivity, toughness and flexibility. This tape could be rolled up on itself even at temperatures as high as 60° C. There was no evidence of cold flow which in any way affected the information recorded by means of the deformations on the surface of the thermoplastic layer nor was any sticking observed between the thermoplastic surface and the polyethylene terephthalate backing in the rolled-up state.

The following example shows the effect of varying the molar percent of chain-regulating ingredients namely, phenol.

EXAMPLE 3

Employing the same apparatus as described in Examples 1 and 2, essentially equal molar concentrations of bisphenol A and adipyl chloride were reacted with varying amounts of phenol. The bisphenol A, adipyl chloride and phenol were reacted employing the conditions recited in Example 1 and the polyester obtained in each instance was thereafter applied to a chromium-coated polyethylene terephthalate film, again using the same conditions, tapes, and thicknesses recited in Example 1. The fluid temperature and stick temperature of the thermoplastic layer was determined in each instance as well as the flexibility of the thermoplastic layer. In addition, each optically clear tape was subjected to an electron beam writing similarly as was done in the preceding examples and thereafter the developed tape was placed in an optical system similar to that described in the Glenn applications. In each instance the picture projected by means of this optical system was clear.

The following Table I shows the mol percents of bisphenol A, adipyl chloride and phenol used to make the polyester compositions, the fluid temperature and the stick temperatures of the thermoplastic layer prepared therefrom, as well as the adhesion and flexibility characteristics of the polyester layer. Table I also gives the intrinsic viscosities of each of the polyester compositions obtained which were within the approximate molecular weight range of from 2000 to 3000.

*Table I*

| Mol Percent | | | Fluid Temp., ° C. | Stick Temp., ° C. | Flexibility | | [n] dl./g. (Intrinsic Viscosity) |
|---|---|---|---|---|---|---|---|
| Bisphenol A | Phenol | Adipyl Chloride | | | Minimum Thickness Mandrel, inches | Thickness of Polyester Layer, microns | |
| 47.6 | 3.30 | 49.1 | 114 | 65 | 3/16 | 5 | 0.81 |
| 47.8 | 4.30 | 47.9 | 107 | 63 | 1/4 | 5 | 0.17 |
| 47.6 | 4.80 | 47.6 | 96 | 62 | 1/4 | 5 | 0.41 |
| 47.3 | 5.10 | 47.6 | 95 | 65 | 1/4 | 7.5 | 0.15 |

EXAMPLE 4

When equal molar percents of succinyl chloride and bisphenol A or sebacyl chloride and bisphenol A were reacted similarly as done in the previous examples, there were obtained polyester compositions whose stick temperatures were quite low within the range of between 45–58° C. The polyester obtained from the succinyl chloride and the bisphenol A was brittle and in one instance crystallized from solution. The tape containing the thermoplastic layer prepared from the sebacyl chloride-bisphenol A reaction product could not be written on when subjected to an electron beam similarly as was done in the previous examples. This illustrates the criticality of the number of aliphatic carbon atoms present in the thermoplastic layer in relation to the type of writing. The tape using the bisphenol-A-sebacate polyester as the thermoplastic layer had excessive cold flow at room temperature and was useless for recording purposes for which the adipate polyesters had shown suitability.

EXAMPLE 5

In this example polyester resins were prepared by reacting bisphenol-A with varying amounts of adipyl chloride and succinyl chloride employing essentially the same conditions as were used in Example 1. In general the bisphenol-A, adipyl chloride, and succinyl chloride were mixed together in a solvent, specifically, monochlorodiphenyl, employing the desired molar concentrations of the ingredients. In one instance, phenol was employed as a chain-regulating agent. The reaction mixture in each instance was heated at about 250–260° C. for a period of from 2 to 3 hours. The polyester resins thus obtained which consisted essentially of the recurring units

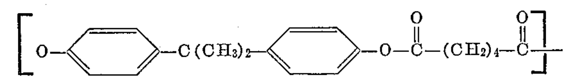

and

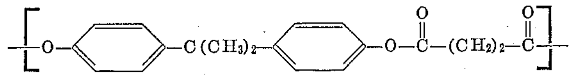

were isolated similarly as was done in Example 1. Each of the polyesters (in the form of a 25 weight percent benzene solution) was applied directly to a 0.001 micron thick chromium-coated surface deposited on a 30 mm. wide by 0.004 inch thick optically clear polyethylene terephthalate tape. After removal of the solvent from the polyester coating it was found that the thickness of the coating was approximately 7.5 microns thick. Each of the tapes thus prepared was tested for flexibility by winding them around mandrels to determine the smallest mandrel around which the tape could be wound without there occurring any cracking or lifting of the thermoplastic layer. Each of these tapes was also written upon in the manner described above and in the aforesaid Glenn applications and when projected each tape gave clear well-defined images. The following Table II shows the molar concentrations of ingredients used to prepare the polyester resins, the stick temperatures and fluid temperatures of the resins, the adhesive properties as well as flexibility of a 7.5 micron thick coating around the mandrels.

*Table II*

| Mol Percent BPA[1] | Mol Percent Adipyl Chloride | Mol Percent Succinyl Chloride | Mol Percent Phenol | Stick Temp., ° C. | Fluid Temp., ° C. | Flexibility, Minimum Thickness Mandrel, inches |
|---|---|---|---|---|---|---|
| 56.1 | 33.9 | 10.0 | --------- | 65 | 90 | <1/4 |
| 47.4 | 29.6 | 19.0 | 4.0 | 77 | 108 | 3/8 |
| 52.5 | 26.3 | 21.2 | --------- | 88 | 115 | 5/16 |

[1] Bisphenol-A.

All the coated tapes were optically clear and showed no cracking or separation from the chromium substrate when bent around the above mandrels.

EXAMPLE 6

Employing the reaction vessel described in Example1, equimolar concentrations of 18.6 parts adipyl chloride and 19.8 parts 4,4'-(dihydroxydiphenyl)methane in 132 parts benzene (as solvent) were heated at the reflux temperature of the mass for a period of about 5¾ hours. The polyester thus obtained which was composed of recurring units of the formula

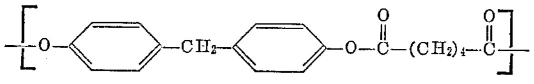

was precipitated with methanol and purified and isolated similarly as was done in Example 1. Two precipitations of the polymer from a benzene-methyl ethyl ketone solvent using methanol as the precipitating agent gave a solid polymer having an average molecular weight of about 3200. To make an optically clear recording tape, a benzene-methyl ethyl ketone solution of this polyester was applied to a chromium-coated polyethylene terephthalate tape in the same manner as was done in Example 1, the solvent removed by air drying and heating to a temperature of about 120–140° C. This resulted in deposition of a polyester thermoplastic layer of about 10–12 microns thick. The optically clear tape prepared in this way could be wound around mandrels as small as ¼ inch in diameter without cracking or crazing of the polyester film or separation of the latter thermoplastic film from the chromium substrate. The thermoplastic polyester coating was found to have a liquid temperature of about 95° C. and a stick temperature of about 60° C. This recording medium could be written on in the same manner as was done in the previous examples, and when projected as described in the aforesaid Glenn applications gave clear images.

EXAMPLE 7

In this example, on a weight basis, 90 percent of a diphenyl silicone, and 10 percent of a dimethyl phenylene ether polymer having recurring units of the formula

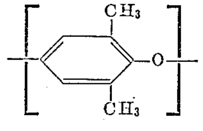

(these ingredients being prepared in accordance with the directions described in the aforementioned Boldebuck application) were intimately mixed together in a toluene solvent. A sample of this solution in about a 25 weight percent concentration was applied to a chromium-coated polyethylene terephthalate film to a thickness of about 8 to 10 microns, and the coating dried. Attempts to bend this film around a ¾ to 1 inch diameter mandrel resulted in cracking of the film. As the thickness of the thermoplastic layer (composed of the two ingredients)

increased, the diameters of mandrels around which the tape could be bent without cracking or other evidence of deterioration, were also greatly increased.

It will of course be apparent to those skilled in the art that in place of the polyesters used in the previous examples, one can employ other polyesters, many examples of which have been given above, without departing from the scope of the invention. In addition, the recording media can also be varied as far as the backing, metal substrate, etc., are concerned.

Various modifying agents which do not adversely affect the properties required for the thermoplastic recording medium can be employed as, for instance, various plasticizers to raise or lower the liquid melting point of the thermoplastic layer, etc. In place of the polyethylene terephthalate other backings can be employed as, for instance, the polycarbonate resins heretofore recited.

The thermoplastic compositions and tapes made therewith can be employed in various applications and are particularly useful for recording of computer information. In addition, they can be used in the movie film industry whereby these tapes can be used to record the action being filmed and the image can be processed immediately after the action has been recorded on the film and by suitable optical apparatus transferred and projected to determine whether the action which was taken with the film is acceptable and satisfactory for final showing.

Additional directions for using recording media of the type described in the instant application can be found in the copending application of William E. Glenn, Jr., Serial No. 8,842, filed February 5, 1960, and assigned to the same assignee as the present invention.

Instead of heating the tape in the irradiation apparatus as was done in the preceding examples, the electron recorded information can be "developed" by outside heat treatment. One method comprises applying a current or blast of hot air to the surface of the charged thermoplastic layer where the temperature of the air is sufficiently high to effect liquefication of the thermoplastic layer to the desired degree of flowability to cause the deformation on the surface thereof; another method comprises using radio frequency heating to arrive at the proper temperature for causing deformation of the surface of the thermoplastic layer; and finally, particularly when a tape is employed, the tape is passed over a heated drum maintained at the proper temperature wherein the surface of the base member furthest from the thermoplastic layer is in direct contact with the heated drum so that heat diffuses upward through the tape to the thermoplastic layer to cause the above-mentioned fusion and flowability of the latter.

The polyethylene terephthalate tape employed in the preceding examples and the methods for manufacturing this particular tape are more particularly disclosed in U.S. Patents 2,465,319—Whinfield et al., issued March 22, 1949, and 2,779,684—Alles, issued January 29, 1957. The latter Patent 2,779,684 recites in greater detail the processing of polyethylene terephthalate film employed in the manufacture of the aforesaid Cronar.

What we claim as new and desire to secure by Letters Patent of the United States is:

1. A recording film consisting essentially of a flexible base supporting member and a thermoplastic layer comprising a polyester composed essentially of recurring units of the formulas

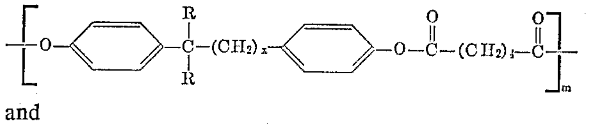

and

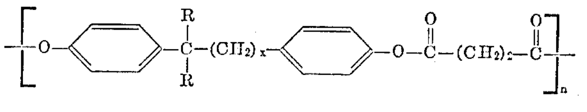

where X may be the same or different members selected from the class consisting of hydrogen and the methyl group, $x$ is a whole number equal to from 0 to 1, $m$ is a whole number equal to from 5 to 14, inclusive, and $n$ is a whole number equal to from 0 to 4, inclusive, the sum of $m+n$ being at most equal to 14.

2. An optically clear recording film consisting essentially ($a$) a flexible, heat-resistant, transparent base supporting member, ($b$) a thermoplasitc layer comprising a solid polyester composed essentially of recurring units of the formulas

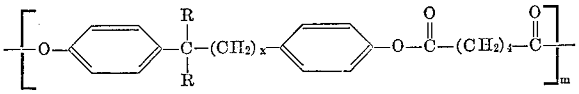

and

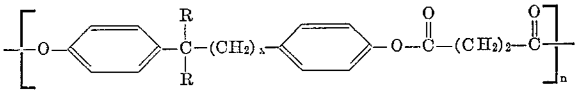

where R may be the same or different members selected from the class consisting of hydrogen and the methyl group, $x$ is a whole number from 0 to 1, $m$ is a whole number equal to from 5 to 14, inclusive, and $n$ is a whole number equal to from 0 to 4, inclusive, the sum of $m+n$ being at most equal to 14, and ($c$) an intermediate transparent conducting layer between the base member and the thermoplastic layer.

3. An optically clear recording film consisting essentially of a flexible, transparent, heat-resistant supporting base member, a thermoplastic layer comprising a solid polyester composed essentially of recurring units of the formula

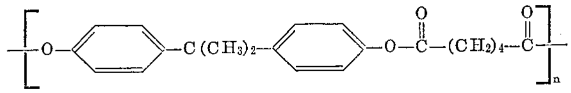

where $n$ is a whole number equal to from 5 to 14, inclusive, and an intermediate transparent conducting layer between the base member and the thermoplastic layer.

4. An optically clear recording film consisting essentially of a flexible, heat-resistant, transparent supporting base member, a thermoplastic layer comprising a solid polyester composed essentially of recurring units of the formula

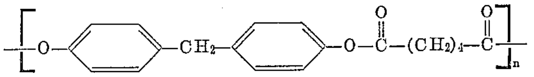

where $n$ is a whole number equal to from 5 to 14, inclusive, and an intermediate transparent conducting layer between the base member and the thermoplastic layer.

5. An optically clear recording film consisting essentially of a flexible, heat-resistant, transparent supporting base member, a thermoplastic layer comprising a solid polyester composed essentially of recurring units of the formulas

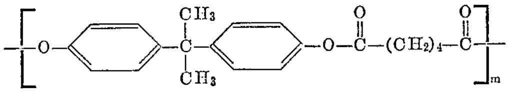

and

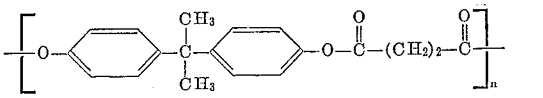

where $m$ is a whole number equal to from 5 to 14 inclusive, and $n$ is a whole number equal to from 0 to 4 inclusive, the sum of $m+n$ being at most equal to 14, and an intermediate transparent conducting layer between the base member and the thermoplastic layer.

6. An optically clear recording medium consisting essentially of (1) a polyethylene terephthalate supporting base member, (2) an outer thermoplastic layer comprising a polyester composed essentially of recurring units of the formula

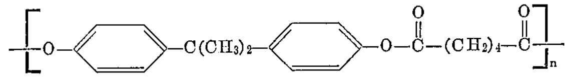

where $n$ is a whole number equal to from 5 to 14, inclusive, and an intermediate transparent conducting layer comprising chromium in contact with the base member and the thermoplastic layer.

7. An optically clear recording medium consisting essentially of (1) a polyethylene terephthalate supporting base member, (2) an outer thermoplastic layer comprising a polyester composed essentially of recurring units of the formula

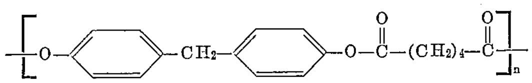

where $n$ is a whole number equal to from 5 to 14, inclusive, and an intermediate transparent conducting layer comprising chromium in contact with the base member and the thermoplastic layer.

8. An optically clear recording medium consisting essentially of (1) a polyethylene terephthalate supporting base member, (2) an outer thermoplastic layer comprising a polyester resin composed essentially of recurring units of the formulas

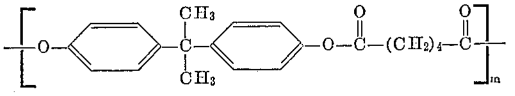

and

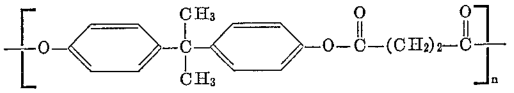

where $m$ is a whole number equal to from 5 to 14 inclusive, and $n$ is a whole number equal to from 0 to 4 inclusive, the sum of $m+n$ being at most equal to 14, and an intermediate transparent conducting layer comprising chromium in contact with the base member and the thermoplastic layer.

References Cited in the file of this patent

UNITED STATES PATENTS 2,675,367 Caldwell ---------------- Apr. 13, 1954
2,985,866 Norton ------------------ May 23, 1961